July 3, 1928. 1,675,347
C. F. HAMMOND ET AL
APPARATUS FOR BOILING OR RAISING THE TEMPERATURE
OF WATER AND OTHER LIQUIDS
Filed Sept. 4, 1926  3 Sheets-Sheet 1

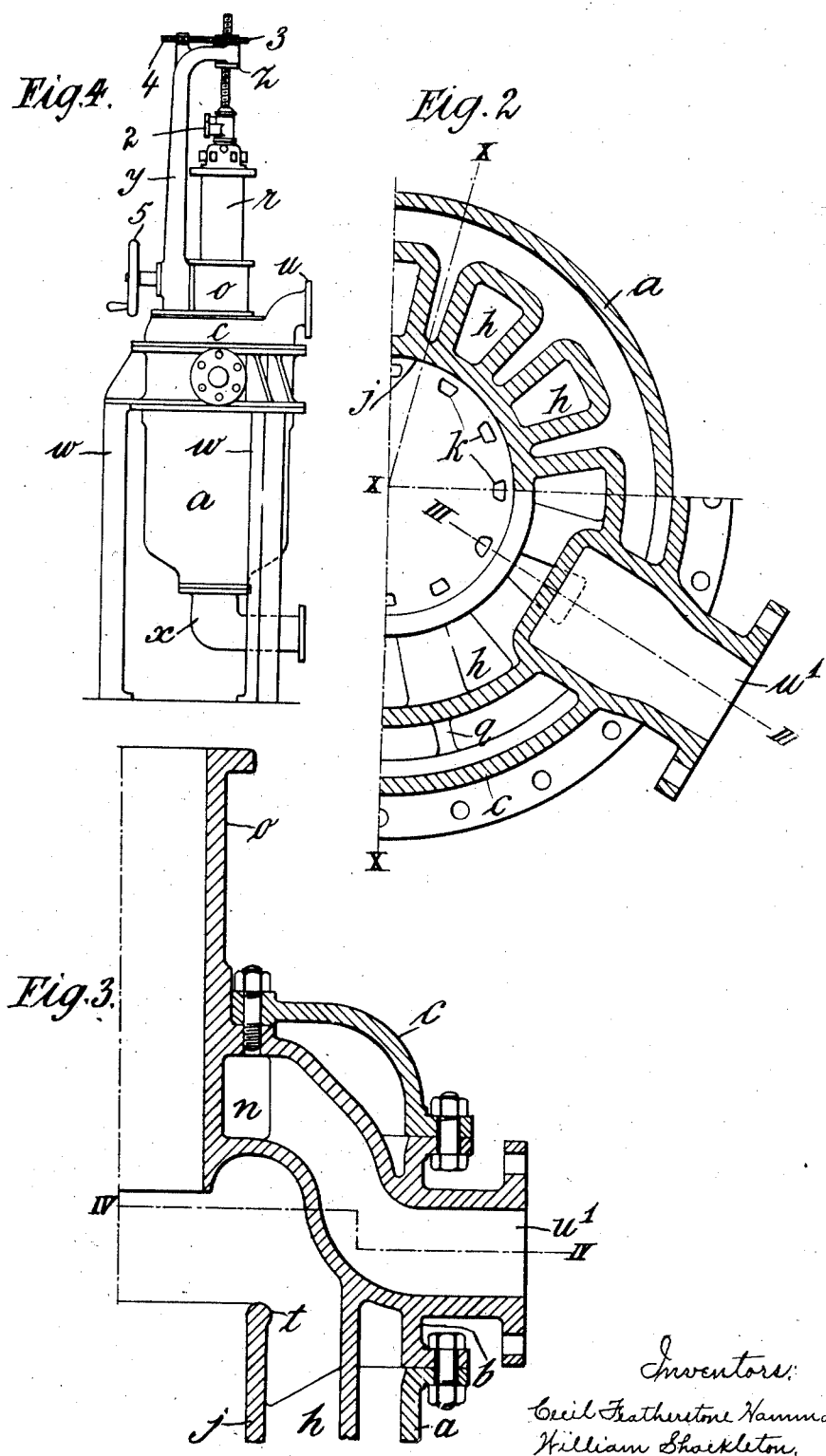

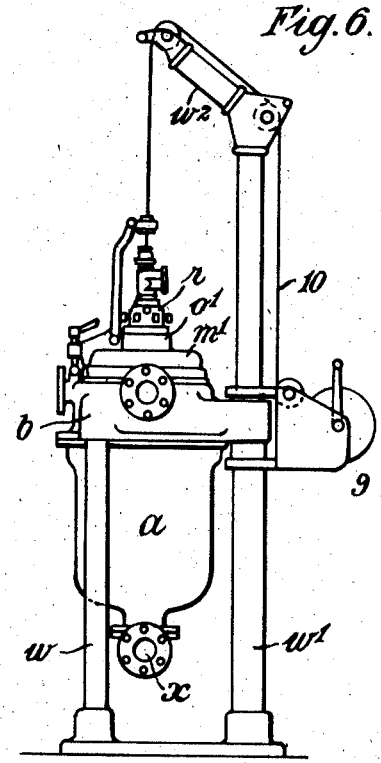
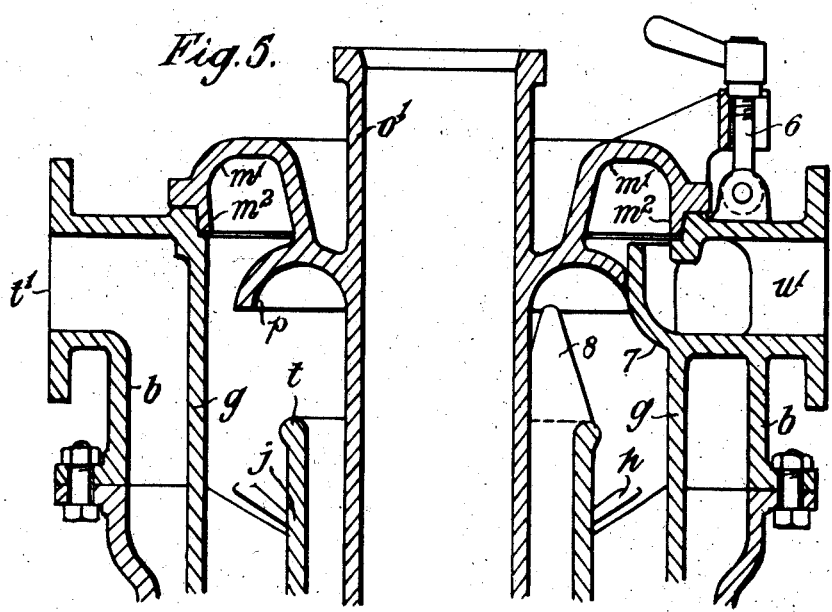

Patented July 3, 1928.

1,675,347

UNITED STATES PATENT OFFICE.

CECIL FEATHERSTONE HAMMOND AND WILLIAM SHACKLETON, OF LONDON, ENGLAND.

APPARATUS FOR BOILING OR RAISING THE TEMPERATURE OF WATER AND OTHER LIQUIDS.

Application filed September 4, 1926, Serial No. 133,682, and in Great Britain September 5, 1925.

This invention relates to apparatus for heating water and other liquids by means of a submerged flame burner, the said apparatus being applicable for steam generation, boiling or evaporating or like operations, and simple heating operations such as may be required in heating and other installations. In the employment of the submerged flame burner, it may be very desirable to protect the liquid to be heated, or the vapours thereof, against contamination by the products of combustion, and in any event it is important to provide for the most efficient transmission of the heat of the submerged flame to the liquid to be heated.

When heating of a liquid takes place through the medium of a metal wall or partition and the comparatively cool liquid is in direct contact with such wall, the temperature of the surface of this metal wall in contact with the source of heat, whether it be hot gases or fire, is largely determined by the temperature of the comparatively cool liquid lying against the other surface. In ordinary practice, this temperature has been ascertained to be not more than 3° C. to 5° C. higher than the temperature of the before-mentioned liquid. The presence of this cool surface chills the hot gases and forms thereon a cooled stagnant film of gas which inhibits the flow of heat through the septum and forms, in fact, a highly insulating surface. It has been ascertained that if the total resistance to heat transmission of a gas-metal-liquid system be represented by the numeral 100 then the resistance of the gas film alone may be said to be represented by the numeral 95, the remainder being the resistance of the metal itself and the interface between the metal and the liquid to be heated.

It is the presence of this stagnant film which largely determines the design of all heating plants in which partitions are employed to separate the source of heat from the substance to be heated. It is known from the work of Osborne Reynolds that the resistance of this film can be reduced by causing the hot gases to pass at high velocity over the surface of the partition, that is to say, that the quantity of heat conducted through the system gas-metal-liquid is a function of the velocity whence he evolved the formula, $H = A + B\, v\, \rho\, t$, where $H$ is the heat transmitted per unit area, $v$ is the velocity of the heated gases or flame, $\rho$ is the density of such gases, and $t$ is the temperature, $A$ and $B$ being constants depending on the type of apparatus involved.

In other words, the faster the gases flow over the surface, the greater the tendency for the inert film to be scoured or torn from the surface and rolled into the main stream with consequent reduction of film thickness.

Reduction of the film resistance and the consequent increase of the value of the factor of conductivity $K$ by this means has limitations in its practical application. We have discovered that another method can be most advantageously applied to this purpose and improved heating and evaporating apparatus enabling this method to be carried into effect forms the feature of our invention.

We have proved by experiment that the heat transmitted per unit area, under the same conditions of temperature and velocity of the gases is greater through a copper pipe having a wall thickness of $3\frac{1}{2}''$ than that transmitted through a similar pipe having a wall thickness of only $\frac{1}{16}''$.

From this it may be deduced that the resistance of a film is an inverse function of its temperature.

In order to raise the temperature of the film between a plate or partition and the hot gases in contact therewith it is necessary to maintain the temperature of the partition itself, this cannot be done while the partition or plate is in direct contact with the liquid being heated. To remove the cooling effect of the liquid a secondary medium is interposed and this enables the film in contact with the fire to be raised in temperature which allows a greater quantity of heat to enter the partition. Once the heat has entered the body of the partition it readily leaves on the liquid side owing to the absence of gaseous films. It has been seen that the delay action within the body of the copper tube $3\frac{1}{2}''$ wall thickness was in itself sufficient to raise the temperature of the gas film with a consequent increase in the heat transmission.

According to this invention the primary wall or partition is separated from the hot gases by the interposition of a bath of molten metal or other liquid or fusible material or mass, the hot gases being provided by the products of combustion of a burner submerged below the surface of the liquid or molten mass.

The heat from the combustion gases is first transmitted to the liquid or molten mass and thence through the partition or containing wall to the liquid to be heated.

The minute subdivision of the gases provides an enormously increased contact surface between them and the molten mass which then readily conducts the heat to the containing wall unimpeded by a gas film. The interface film is comparatively inconsequential. Thus, the temperature of the surface of the wall or partition in contact with the liquid to be heated is not closely governed by the temperature of such liquid but attains to practically the same temperature as the molten mass from which it is deriving its heat, since the rate per degree temperature difference at which heat is imparted to it is greater than the rate at which it is taken away, the inert gas film having been replaced by a highly conductive medium, for instance molten metal.

By the employment of a partition wall between the molten mass and the liquid heated, the products of combustion from the burner flame submerged in the molten mass are prevented from coming into contact with the liquid heated, or with the vapours, or steam evaporated from such liquid. Also, the pressure of the fuel and air supply depends only upon the submergence of the burner nozzle in the molten mass and is quite independent of the pressure developed in the separate chamber containing the said liquid and its vapours.

In the known method of applying the submerged flame burner to the heating of liquids or the generation of steam it is found that many disadvantages arise from the direct contact of the flame with the substance to be heated. For instance the $CO_2$ of the combustion gases mixing with the steam tends to corrode the apparatus to which the mixture is fed. Furthermore, any sulphur present in the fuel is oxidized to sulphurous acid and gradually accumulates in the containing vessel so that means have to be provided to neutralize this acid as it is formed.

Apart from this contamination it is necessary to prevent the products of combustion from mixing with the steam wherever pure steam is required, as for instance for all condensing machinery and many chemical operations.

In cases where a submerged flame burner is used to generate steam in a boiler for power purposes it is necessary to compress the air and (if gaseous) the fuel to a pressure corresponding to the pressure of the mixture of steam and combustion gases within the boiler. Where such a mixture is used other than for power purposes the energy absorbed in compressing the air and fuel is entirely lost.

In the use of the apparatus in accordance with these improvements, the pressure required to force the air and fuel into the burner is independent of the pressure of the steam in the boiler chamber.

In apparatus for carrying out the invention, the submerged burner is arranged in such a manner as to promote a circulation of the molten mass. Also, a separating and collecting means with draw-off connection is provided for the removal of the combustion gases from the chamber containing the molten mass. Finally, the passage or circulation of the liquid to be heated is advantageously arranged to pass in counter flow in relation to the circulating stream of molten material, the heat exchange being improved by the provision of suitable heat exchange elements, as will be explained.

In order to enable the invention to be readily understood, reference is made to the accompanying drawings illustrating two examples of practical construction in which drawings:—

Figure 1 is a vertical section on the line X—X of Figure 2 and illustrates one construction of heater or boiler in which the heat of a molten mass is transferred to a body of liquid contained in a chamber surrounding the chamber containing the molten mass.

Figure 2 in its upper quadrant is a horizontal section on the line II—II of Figure 1, and in its lower quadrant is an irregular horizontal section on the line IV—IV of Figure 3.

Figure 3 is a vertical section through the upper part of the apparatus, the plane of this section being indicated by the line III—III in Figure 2.

Figure 4 is an elevation to a smaller scale of the apparatus seen in Figures 1 to 3 but mounted upon supports and fitted with raising and lowering gear for the burner.

Figure 5 is a vertical section of the upper portion of a slightly modified construction.

Figure 6 is an elevation to a smaller scale of the apparatus seen in Figure 5 but mounted upon supports and fitted with raising and lowering gear for the burner.

Figure 1:
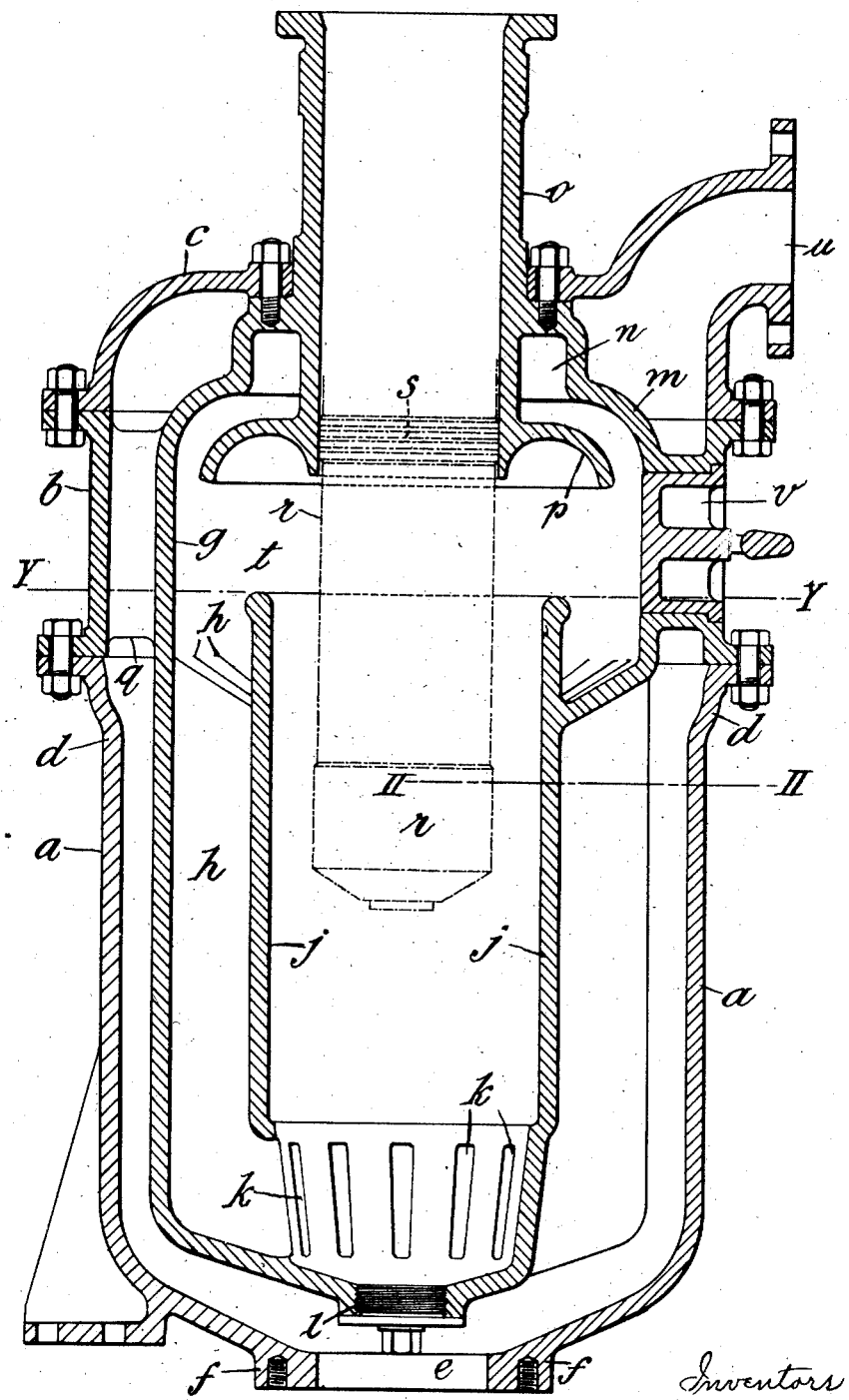

Referring to Figures 1 to 4 of the drawings, the shell of the heater boiler or steam generator is composed of three superposed parts, $a$, $b$ and $c$. The lower part $a$ is slightly enlarged in diameter at the top by forming the flared part $d$ which is flanged for the bolting down of the middle part $b$. In the bottom of the part $a$ there is a central aperture $e$ for the admission of the water or other liquid to be heated, and the said bottom is suitably formed at $f$ for the bolting on of a supply pipe or connection. From the part $b$ there is suspended a chamber for containing the molten material, this chamber comprising a cylindrical upper body portion $g$, a lower portion composed of a circular series of vertical ducts $h$ surrounding a vertical and central circulation tube $j$. The upper end of the tube $j$ extends upwards into the body portion $g$ above the level of the upper ends of the ducts $h$ and the lower end of the ducts $h$ open into the bottom portion of the tube $j$ through the ports $k$. The lower end of the tube $j$ is closed by a bottom in which is screwed a plug $l$, the latter being removable for permitting of the drawing off of the molten material when desired. The top of the cylindrical body portion $g$ is formed with a dome part $m$ and an annular hood part $n$, the latter supporting a central vertical tube part $o$ which is formed at its lower end with an annular deflector $p$. The body part $g$ may be formed integrally with the shell part $b$, being connected with the latter by the webs $q$. However, it will be understood that so far as the invention is concerned, parts above described as being in one piece may be made of separate pieces suitably connected together. The annular space between the parts $b$ and $g$ is covered in by the top shell part $c$ which is bolted down upon $b$ or is fastened down by suitable fastenings. The tube $o$ serves as a guide and holder for a burner $r$ which is fitted with suitable packing rings $s$ for preventing the escape of heat and gases whilst permitting of the up and down adjustment of the burner $r$. The packing rings $s$, may be inserted in grooves formed in the body of the burner $r$. As will be seen by comparing Figures 1 and 2, the ducts $h$ are separated by spaces to which the water admitted to the shell part $a$ has access for the purpose of obtaining an efficient heat exchange.

The operation of the parts so far described is as follows:—The chamber $g$, $h$, $j$ is provided with a charge of lead or other fusible material and when this is rendered molten by the heat from the burner $r$ the level of the molten bath may be that indicated by the line Y—Y in Figure 1. Owing to the central heating by the burner $r$ and to the circulation tube $j$, and particularly when the burner nozzle and its flame are submerged as shown, so that the products of combustion of the burner lighten the column in the tube $j$, circulation of the molten mass is promoted, with the consequence that there is an uprising stream in the tube $j$ and an overflow over the top edge $t$ of such tube. Also, there is a descent of the molten mass through the ducts $h$, the cooled material passing from such ducts through the ports $k$ and into the tube $j$ wherein it comes under the influence of the burner flame. If the apparatus is used as a steam generator, water is fed in through the inlet $e$ and ascends within the shell part $a$ and in contact with the heated ducts $h$. The steam thus generated ascends into the dome of the cover part $c$ and is taken off through a steam pipe bolted on to the elbow connection $u$ on the cover $c$ as seen in Figure 1. The upward flow of water and steam within the shell part $a$ is counter to the downward flow of molten lead or the like within the ducts $h$.

The means for carrying off the products of combustion comprises a bent duct $u'$ extending through the cylindrical wall of the shell part $b$ and upwardly to the hood portion $n$ of the chamber $g$. The gases of combustion ascend and separate from the rising stream of molten material and pass upwards to the hood $n$, their interception by the deflector $p$ having the effect of throwing down into the bath or mass any splashes or particles of lead or molten material. The gases escape from the hood through the duct $u'$ from which they may be led away to an economizer device or other suitable apparatus or place. The steam generated in the apparatus may be used for power, heating or other useful purposes.

For the maintenance of the efficient circulation of the molten material, particularly when lead is employed, a handhole, normally closed by a plug $v$, is provided about at the level Y—Y. At any suitable time, the handhole can be opened and the dross or impurities can be run off or raked off through such handhole, as will be readily understood.

Referring to Figure 4, it will be seen that the apparatus is mounted on suitable supports or columns $w$, a bent duct $x$ being bolted to the bottom of the shell part $a$ and adapted for coupling up with a water feed. On the cover part $c$ there is erected a column $y$, the upper end of such column being bent over and fitted with a nut $z$ which is revoluble but not movable endwise in a bearing in the extremity of the bent column. The burner $r$ is suspended by a screw working in the nut and suitably prevented from revolving. The gas and air connections 1 and 2 for the burner $r$ are seen in Figure 4. The nut $z$ has attached to it a toothed wheel 3 meshing with a toothed wheel 4 at the head of a vertical shaft within the column $y$, this shaft being driven through bevel gearing, not seen, by the hand wheel 5. Naturally, it would be possible to adapt other gears for the raising and lowering of the burner $r$.

According to the modification illustrated by Figure 5, the top cover part $o$ of Figure 1 is dispensed with and the open top of the shell part $b$ is closed by the hood formation $m'$ on a tube $o'$. The hood $m'$ is not bolted down on the part $b$ but is secured by suitable hinged fastening devices to a spigot and socket joint being formed at $m^2$. In this modification, both the steam outlet connection $t'$ and the outlet for the products of combustion $u'$ are formed on the shell part $b$ and the entry for such products into the outlet connection $u'$ is guarded by an upwardly bent deflector 7, this latter being an additional precaution against the passage of molten material with the gases of combustion into the outlet. As in the construction described with reference to Figures 1 to 4, a deflector $p$ is provided on the tube $o'$ for the interception and throwing down of splashes or particles of molten lead or material cast up by ebullition or carried up by the gases. The central tube $j$ Figure 5, is fitted with inwardly extending radial fins one of which is shown at 8, which serves for centering and guiding the tube $o'$ which receives the burner.

However, it will be apparent that the chamber for containing the molten material may have any suitable construction adapted for effecting an efficient heat exchange between such molten material and the liquid or fluid to be heated.

In Figure 6, the apparatus described with reference to Figure 5, is shown mounted upon columns $w\ w'$, the latter being extended upwardly and fitted with a crane arm $w^2$. A winch 9 is provided for raising and lowering the burner $r$ hood $m'$ and tube $o'$ by means of a suitable cable 10.

As examples of the advantageous use of the invention, apart from its employment as water heater or steam generator, the following may be mentioned:

For the sublimation of sulphur, the heat of the escaping products of combustion may be applied for pre-heating and liquefying the sulphur, which is then admitted at the inlet $e$ and is heated to sublimation in the heater $a$, the sublimated sulphur being carried off at $u$.

For the process of cracking oils, the latter are admitted at $e$ and the cracked product drawn off at $u$, and if desired the oils, or other liquid to be treated in the apparatus, may be caused to perform a circuitous or extended course within the heater.

Finally, when used as a steam generator, the admission may be controlled so that the apparatus operates as a flash boiler.

In any employment of the apparatus in which it is desired that the liquid to be heat-treated should follow an extended or circuitous course, suitable ducts, deflectors or baffles may be adopted for this purpose. As a development of this, there may be submerged within the circulating body of molten lead a duct, such as a helical or serpentine duct through or to which the liquid to be treated or evaporated is passed or admitted.

We claim:—

1. Heat apparatus comprising in combination, a heating chamber adapted to contain a mass having a liquid condition at elevated temperatures, a submersible burner projected into said chamber for maintaining combustion while submerged in the liquid mass, and for causing circulation of said mass, means to direct the course of the latter, and a fluid container in heat exchange relation with said heating chamber.

2. Heat apparatus comprising in combination, a heating chamber adapted to contain a mass having a liquid condition at elevated temperatures, a submersible burner projected into said chamber for maintaining combustion while submerged in the liquid mass, an air-lift tube surrounding the submerged burner and constituting part of a circulatory system within said chamber, and a fluid container in heat exchange relation with said heating chamber.

3. Heat apparatus comprising in combination, a heating chamber adapted to contain a mass having a liquid condition at elevated temperatures, a burner projected into said chamber for maintaining combustion while submerged in the liquid mass, a tube surrounding the submerged portion of said burner and communicating freely with upper and lower portions of the liquid mass and disposed so that the gases of combustion from said burner are released into the column of liquid contained in said tube, and a fluid container in heat exchange relation with said heating chamber.

4. Heat apparatus comprising in combination, a heating chamber adapted to contain a mass having a liquid condition at elevated temperatures, a burner projected into said chamber for maintaining combustion while submerged in said mass, a tube surrounding the submerged portion of said burner and communicating freely with upper and lower portions of the liquid mass and disposed so that the gases of combustion from said burner are released into the column of liquid contained in said tube, an escape flue for said gases at the head of said chamber, deflector means in the path of said gases from said liquid to said flue, and a fluid container in heat exchange relation with said heating chamber.

5. In heat apparatus and in combination, a heating chamber comprising upper and lower spaces, a central lift tube and an outer series of descent ducts, connecting the upper and lower spaces, a mass contained within said chamber and having a liquid condition at elevated temperatures, a burner, a burner support in the top of said chamber said support being adapted to hold said burner with its nozzle submerged in the column within said lift tube, a flue device at the head of said chamber, and a fluid container in heat exchange relation with said heating chamber.

6. Heat apparatus comprising in combination, a heating chamber composed of a central air-lift column, upper and lower spaces communicating with respective ends of such column, and ducts communicating between said spaces, a submersible burner supported so that its nozzle is disposed within said column, a heat transfer medium contained as a charge within said chamber, said medium being matter which is liquid at elevated temperatures and said charge being of a volume sufficient for submerging the nozzle of said burner, and a duct for conducting fluid within the heating influence of said medium.

7. Heat apparatus comprising a heater chamber for containing a charge of matter which is liquid at elevated temperatures, a combined heater and circulator within said chamber comprising a burner having its nozzle submerged in said matter and a lift tube surrounding said burner, a duct for conducting fluid to be heated in counter flow to a movement of the charge of matter in circulation, and flue means for removing gases of combustion from said chamber.

8. In heat apparatus, a heater chamber comprising a central hollow column surrounded by but having its upper end elevated above a plurality of ducts, said hollow column and ducts communicating with one another at the lower end and with the top space of the chamber at the upper end, a burner supported with its nozzle extending into said column, an escape flue at the head of said chamber, a charge of matter liquid at elevated temperatures filling said column and ducts and submerging the nozzle of said burner, and a duct adapted for conducting fluid in heat exchange relation with said charge.

9. Heat apparatus comprising a heating chamber for containing a liquid charge, an open ended hollow column supported therein, a submersible burner suspended in said chamber so that its nozzle enters said column to a substantial depth, flue means for the escape of gases of combustion at the head of said chamber, and a shell enclosing said chamber but spaced therefrom and having fluid inlet and outlet means.

C. FEATHERSTONE HAMMOND.
WILLIAM SHACKLETON.